US012423043B2

(12) United States Patent
Uchikoshi et al.

(10) Patent No.: US 12,423,043 B2
(45) Date of Patent: Sep. 23, 2025

(54) DISPLAY CONTROL DEVICE, DISPLAY CONTROL METHOD, AND RECORDING MEDIUM

(71) Applicant: Panasonic Automotive Systems Co., Ltd., Kanagawa (JP)

(72) Inventors: Tadahiro Uchikoshi, Tokyo (JP); Masahito Oishi, Kanagawa (JP); Shintaro Miike, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 18/642,006

(22) Filed: Apr. 22, 2024

(65) Prior Publication Data
US 2024/0272858 A1    Aug. 15, 2024

Related U.S. Application Data

(63) Continuation of application No. PCT/JP2022/038866, filed on Oct. 19, 2022.

(30) Foreign Application Priority Data

Oct. 29, 2021    (JP) .................. 2021-177342

(51) Int. Cl.
*G06F 3/14*    (2006.01)
*B60K 35/29*    (2024.01)
(Continued)

(52) U.S. Cl.
CPC .......... *G06F 3/1423* (2013.01); *B60W 50/14* (2013.01); *G06F 3/01* (2013.01); *G08G 1/16* (2013.01);
(Continued)

(58) Field of Classification Search
CPC ........ G06F 3/1423; G06F 3/01; B60W 50/14; B60W 2050/146; G08G 1/16;
(Continued)

(56) References Cited

U.S. PATENT DOCUMENTS

| 10,652,387 | B2 * | 5/2020 | Tsuji | ..................... | B60K 35/81 |
| 2008/0088425 | A1 * | 4/2008 | Hara | ..................... | B60K 35/23 |
| | | | | | 340/438 |
| 2015/0079963 | A1 * | 3/2015 | Sun | ................... | H04M 1/72484 |
| | | | | | 455/418 |

FOREIGN PATENT DOCUMENTS

| JP | 2007-249567 | 9/2007 |
| JP | 2013-154713 | 8/2013 |

OTHER PUBLICATIONS

Int'l Search Report for PCT/JP2022/038866, dated Jan. 10, 2023, along with an English language translation thereof.
(Continued)

Primary Examiner — Douglas Wilson
(74) Attorney, Agent, or Firm — GREENBLUM & BERNSTEIN, P.L.C.

(57) ABSTRACT

A display control device includes: a determiner that determines whether an information amount of first display information displayed on a first display device is greater than or equal to a predetermined threshold value; and a controller that (i) causes the first display device to display the first display information and first notification information about a predetermined event, and (ii) causes a second display device to display second notification information about the predetermined event, when the determiner determines that the information amount of the first display information is greater than or equal to the predetermined threshold value, the second display device being different from the first display device, the second notification information including the first notification information and having an information
(Continued)

amount larger than an information amount of the first notification information.

11 Claims, 8 Drawing Sheets

(51) Int. Cl.
*B60W 50/14* (2020.01)
*G06F 3/01* (2006.01)
*G08G 1/16* (2006.01)
*G08G 1/0969* (2006.01)

(52) U.S. Cl.
CPC ........ *B60K 35/29* (2024.01); *B60K 2360/182* (2024.01); *B60K 2360/186* (2024.01); *B60K 2360/1868* (2024.01); *B60K 2360/1876* (2024.01); *B60W 2050/146* (2013.01); *G08G 1/0969* (2013.01)

(58) Field of Classification Search
CPC ........ G08G 1/0969; G01C 21/36; G09G 5/00; B60K 35/29; B60K 2360/182; B60K 2360/186; B60K 2360/1868; B60K 2360/1876

See application file for complete search history.

(56) References Cited

OTHER PUBLICATIONS

Notice of Reasons for Refusal for Japanese Patent App. No. 2021-177342, dated Dec. 10, 2024, with English translation.

* cited by examiner

FIG. 6

| Priority level | Output mode | | | | |
|---|---|---|---|---|---|
| | Voice | Blinking | Location display | Same color display |
| High | ○ | ○ | ○ | ○ |
| Medium | — | ○ | ○ | ○ |
| Low | — | — | ○ | ○ |

DISPLAY CONTROL DEVICE, DISPLAY CONTROL METHOD, AND RECORDING MEDIUM

CROSS REFERENCE TO RELATED APPLICATIONS

This is a continuation application of PCT International Application No. PCT/JP2022/038866 filed on Oct. 19, 2022, designating the United States of America, which is based on and claims priority of Japanese Patent Application No. 2021-177342 filed on Oct. 29, 2021.

FIELD

The present disclosure relates to a display control device, a display control method, and a recording medium.

BACKGROUND

A conventional display device is disposed in a vehicle and notifies a user such as a driver of the vehicle of information.

A display device disclosed in Patent Literature (PTL) 1 causes, among a plurality of display instruments, a display instrument upon which a user has turned the user's eyes to display a message, based on a detection result of a line of sight of the user.

A display control device disclosed in PTL 2 determines, from among a plurality of display devices, a display device to be caused to display content, based on a traveling state of a vehicle, a type of the content, and disposed positions of the plurality of display devices.

CITATION LIST

Patent Literature

PTL 1: Japanese Unexamined Patent Application Publication No. 2007-249567
PTL 2: Japanese Unexamined Patent Application Publication No. 2013-154713

SUMMARY

However, the display device according to PTL 1 and the display control device according to PTL 2 can be improved upon.

In view of this, the present disclosure provides, for example, a display control device capable of improving upon the above related art.

A display control device according to one aspect of the present disclosure comprising: a determiner circuit that determines whether an information amount of first display information displayed on a first display device is greater than or equal to a predetermined threshold value; and a controller circuit that (i) causes the first display device to display the first display information and first notification information about a predetermined event, and (ii) causes a second display device to display second notification information about the predetermined event, when the determiner circuit determines that the information amount of the first display information is greater than or equal to the predetermined threshold value, the second display device being different from the first display device, the second notification information including the first notification information and having an information amount larger than an information amount of the first notification information.

A display control method according to one aspect of the present disclosure comprising: determining whether an information amount of first display information displayed on a first display device is greater than or equal to a predetermined threshold value; and (i) causing the first display device to display the first display information and first notification information about a predetermined event, and (ii) causing a second display device to display second notification information about the predetermined event, when the information amount of the first display information is determined to be greater than or equal to the predetermined threshold value, the second display device being different from the first display device, the second notification information including the first notification information and having an information amount larger than an information amount of the first notification information.

A recording medium according to one aspect of the present disclosure is a non-transitory computer-readable recording medium having recorded thereon a computer program for causing a computer to execute the display control method according to one aspect of the present disclosure.

It should be noted that these general or specific aspects may be implemented using a system, a method, an integrated circuit, a computer program, or a computer-readable recording medium such as a CD-ROM, or any combination of systems, methods, integrated circuits, computer programs, and recording media.

The present disclosure provides, for example, a display control device capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 6 is a diagram illustrating a specific example of output modes for information according to priority levels.

DESCRIPTION OF EMBODIMENT

Summary of the Present Disclosure

Figure 1:
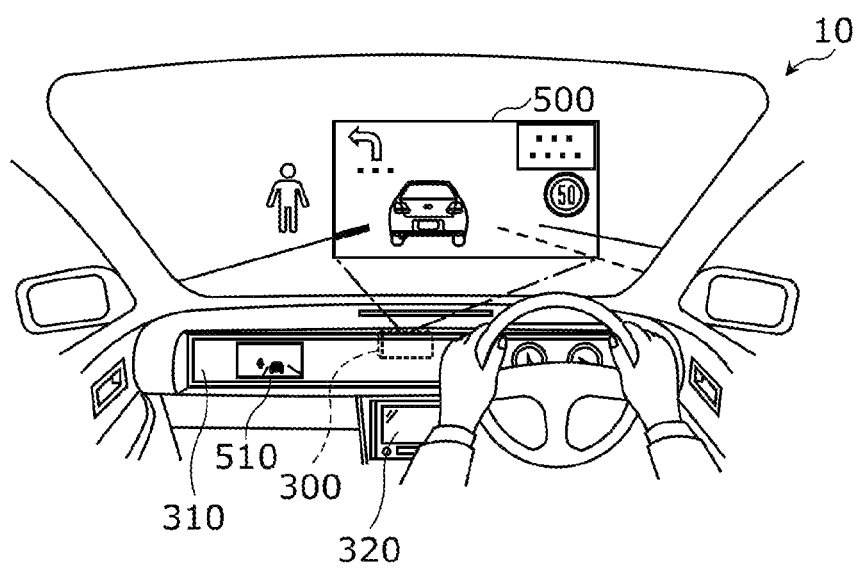
FIG. 1 is a diagram schematically illustrating the interior of a vehicle according to an embodiment.

In recent years, a multi-display environment has been increasingly provided in a vehicle interior due to an integrated cockpit. Concomitantly, an opportunity for causing a display device to display information has been increased due to an increase in size and diversification of an in-vehicle system. In view of this, a display method with an aim to efficiently transmit information to a user such as a driver has been examined.

For example, when various systems such as a camera and a navigation system cause the same display device to display images such as messages, the information amounts of the images displayed on the display device increase. Accordingly, there is a possibility of reducing the visibility. For example, in the case where a plurality of events occur at the same time while a user is watching a head-up display (HUD) carefully, when the display device disclosed in above PTL 1 causes the HUD to display, as images, information items each corresponding to a different one of the plurality of events, the information amounts of the images increase and the visibility is reduced.

In light of the above, for example, a method of switching between modes (e.g., permission and prohibition of display of an information amount and/or information) for information to be displayed according to a priority level of the information, such as displaying only highest-priority information, may be considered. In such a method, however, when there is a lot of information having a high priority level, there is a possibility of not displaying information having a low priority level.

Moreover, in the display control device disclosed in PTL 2, the same display device is also caused to display a lot of information, and there is a possibility of reducing the visibility.

When an information amount that a display device is caused to display increases excessively, a user has difficulty understanding the information displayed on the display device. In other words, the visibility of the information displayed on the display device is reduced. In contrast, when an information amount that the display device is caused to display is reduced, there is a possibility that information that should be notified to the user is not notified to the user.

In view of the above, the present disclosure has an object to provide, for example, a display control device that is capable of inhibiting the reduction of visibility of information displayed on a display device, and inhibiting the reduction of an information amount of information notified to a user.

A display control device according to one aspect of the present disclosure includes: a determiner that determines whether an information amount of first display information displayed on a first display device is greater than or equal to a predetermined threshold value; and a controller that (i) causes the first display device to display the first display information and first notification information about a predetermined event, and (ii) causes a second display device to display second notification information about the predetermined event, when the determiner determines that the information amount of the first display information is greater than or equal to the predetermined threshold value, the second display device being different from the first display device, the second notification information including the first notification information and having an information amount larger than an information amount of the first notification information.

Accordingly, in a display device having a large information amount displayed, for example, in the case where a predetermined event occurs, only simplified information is displayed when new information about the predetermined event is notified to the user. For this reason, it is possible to prevent the information amount displayed on the display device from becoming excessive, and to notify the user of the new information. Moreover, by causing a display device having a small information amount of information displayed to display the details of new information, it is possible for the user to understand the details of the new information at a desired timing. Accordingly, the display control device according to one aspect of the present disclosure makes it possible to inhibit the reduction of visibility of information displayed on a display device, and inhibit the reduction of an information amount of information notified to the user.

Furthermore, for example, the controller notifies a user of first relevance information indicating that the first notification information and the second notification information are relevant to each other.

Accordingly, it is possible for the user to easily understand on which display device the details of the simplified information displayed on the first display device are displayed.

Moreover, for example, the determiner determines whether second display information displayed on the second display device and the second notification information are relevant to each other, and the controller notifies a user of second relevance information indicating that the second display information and the second notification information are relevant to each other, when the determiner determines that the second display information and the second notification information are relevant to each other.

For example, the second display device may constantly display an image of an area surrounding a vehicle captured by an imaging device. In such a case, for example, an event relevant to the image such as a person approaching the vehicle may occur. At a time like this, by causing the second display device to display information indicating that information newly displayed on the second display device and information already displayed on the second display device are relevant to each other, it is possible to help the user more easily understand details of the information newly displayed on the second display device.

Furthermore, for example, the display control device includes a determination unit that selects one display device from among a plurality of display devices based on line-of-sight information indicating a line of sight of a user, and determines the one display device to be the first display device.

Accordingly, since it is possible to cause a display device close to a position being viewed by the user to display first notification information, it is possible to quickly notify the user of new information about a predetermined event.

Moreover, for example, the controller determines the information amount of the first notification information based on the information amount of the first display information, and causes the first display device to display the first notification information having the information amount determined.

Accordingly, since information corresponding to the information amount of information displayed on the first display device is newly displayed on the first display device, it is possible to cause the first display device to further display information having an appropriate information amount.

Furthermore, for example, the first display device and the second display device are disposed in a vehicle, and the determiner sets the predetermined threshold value based on a traveling state of the vehicle.

For example, since it is assumed that a driver has to pay more attention to driving when a vehicle is at high speed than when the vehicle is at low speed, it is considered difficult to obtain information from a display device. In view of this, by appropriately setting an information amount to be displayed on the first display device based on a traveling state of the vehicle such as a speed of the vehicle and a right turn or a left turn made by the vehicle, it is possible to help a user more easily understand information displayed on the first display device.

Moreover, for example, when the determiner determines that the information amount of the first display information is greater than or equal to the predetermined threshold value, the controller causes the first display device to display the second notification information; and when a predetermined condition is satisfied, the controller causes the first display device to display the first notification information instead of the second notification information, and causes the second display device to display the second notification information.

Accordingly, by first notifying the user of details of information that needs to be especially preferentially notified to the user and reducing an information amount when the predetermined condition is satisfied, it is possible to quickly notify the user of a lot of information and inhibit the reduction of visibility of information displayed on the first display device.

Furthermore, for example, when the predetermined condition is satisfied refers to at least one of when the controller obtains action information or when a predetermined time has elapsed since the controller caused the first display device to display the second notification information, the action information indicating that a user has performed an action based on the second notification information.

Accordingly, it is possible to reduce the information amount displayed on the first display device at an appropriate timing.

Moreover, for example, when the determiner determines that the information amount of the first display information is less than the predetermined threshold value, the controller causes the first display device to display the second notification information.

Accordingly, it is possible to prevent a plurality of display devices from displaying the same information unnecessarily.

A display control method according to one aspect of the present disclosure includes: determining whether an information amount of first display information displayed on a first display device is greater than or equal to a predetermined threshold value; and (i) causing the first display device to display the first display information and first notification information about a predetermined event, and (ii) causing a second display device to display second notification information about the predetermined event, when the information amount of the first display information is determined to be greater than or equal to the predetermined threshold value, the second display device being different from the first display device, the second notification information including the first notification information and having an information amount larger than an information amount of the first notification information.

A program according to one aspect of the present disclosure is a computer program for causing a computer to execute the display control method according to one aspect of the present disclosure.

The above method and program produce the same advantageous effects as the above-described display control device.

It should be noted that these general or specific aspects may be implemented using a system, a method, an integrated circuit, a computer program, or a non-transitory computer-readable recording medium such as a CD-ROM, or any combination of systems, methods, integrated circuits, computer programs, and non-transitory recording media.

Hereinafter, an embodiment is described in detail with reference to the drawings.

It should be noted that the embodiment described below shows a general or specific example. The numerical values, shapes, materials, constituent elements, the arrangement and connection of the constituent elements, steps, order of the steps, etc. shown in the following embodiment are mere examples, and are not intended to limit the scope of the present disclosure. Moreover, among the constituent elements in the following embodiment, those not recited in any of the independent claims showing the broadest concept are described as optional constituent elements. Furthermore, the respective figures are schematic diagrams and are not necessarily precise illustrations. Therefore, for example, the scales etc. are not necessarily uniform in the respective figures. Additionally, the same reference signs are assigned to the same constituent elements in the respective figures.

EMBODIMENT

Configuration

Figure 2:
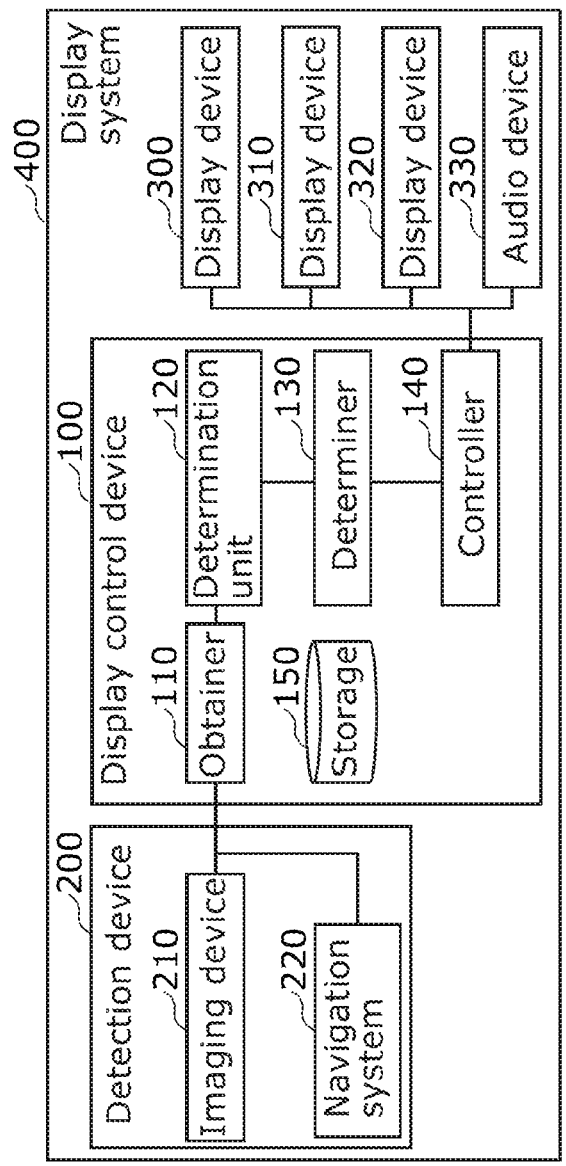
FIG. 2 is a block diagram illustrating a configuration of a display control device according to the embodiment.
Figure 3A:
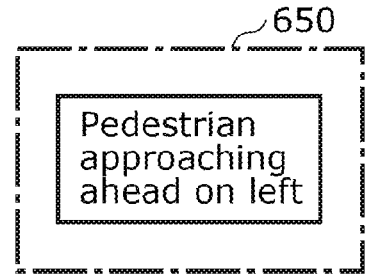
FIG. 3A is a diagram illustrating a specific example of notification information according to the embodiment.
Figure 3B:
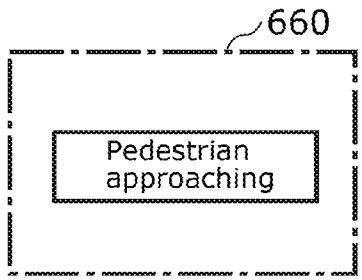
FIG. 3B is a diagram illustrating a specific example of notification information according to the embodiment.
Figure 3C:
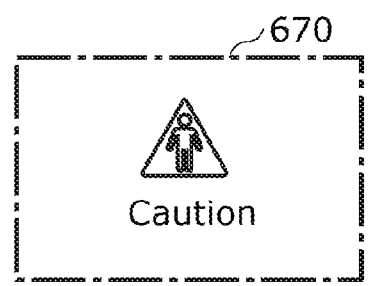
FIG. 3C is a diagram illustrating a specific example of notification information according to the embodiment.
Figure 3D:
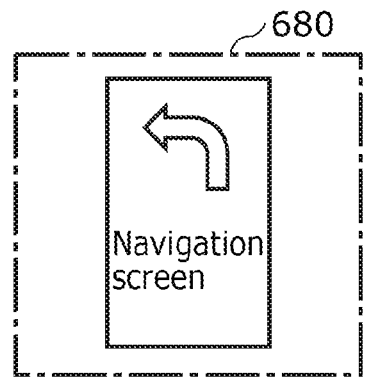
FIG. 3D is a diagram illustrating a specific example of notification information according to the embodiment.
Figure 3E:
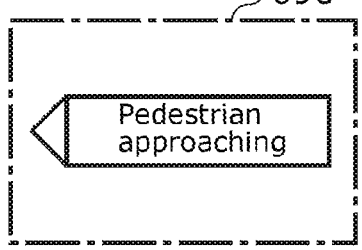
FIG. 3E is a diagram illustrating a specific example of notification information according to the embodiment.

FIG. 1 is a diagram schematically illustrating the interior of vehicle 10 according to an embodiment. FIG. 2 is a block diagram illustrating a configuration of display control device 100 according to the embodiment.

Display control device 100 is a control device that controls images displayed on a plurality of display devices, by controlling the plurality of display devices. In the present embodiment, display control device 100 controls display device 300, display device 310, and display device 320.

Each of display device 300, display device 310, and display device 320 is a display that displays an image.

It should be noted that each of display device 300, display device 310, and display device 320 may be a device that is capable of displaying an image, may be any display device such as a liquid crystal display or a head-up display (HUD), and is not particularly limited. In the present embodiment, display device 300 is a HUD. Moreover, in the present embodiment, display device 310 and display device 320 are liquid crystal displays. Furthermore, in the present embodiment, display device 320 is a display that is included in navigation system 220 and displays, for example, a travel route of vehicle 10 obtained by navigation system 220. In this manner, the display devices controlled by display control device 100 may include display devices included in another system.

It should be noted that in the following description, an image displayed on display device 300 is referred to as display image 500, and an image displayed on display device 310 is referred to as display image 510.

In display system 400 including display control device 100, by causing at least one of display device 300, display device 310, or display device 320 to display an image including information obtained by detection device 200 such as imaging device 210 and navigation system 220, the information is notified to a user such as a driver. Display control device 100 obtains the information from detection device 200, and causes at least one of display device 300, display device 310, or display device 320 to display the image including the information.

For example, when route guidance is provided, an obstacle is present, or a predetermined event such as overspeed occurs, based on detected information, detection device 200 outputs information about the predetermined event (e.g., information indicating the predetermined event) to display control device 100. For example, when detection device 200 determines that an obstacle is present on a travel route of vehicle 10, detection device 200 outputs information indicating the presence of the obstacle on the travel route of vehicle 10. When display control device 100 obtains the information indicating the presence of the obstacle on the travel route of vehicle 10, display control device 100 causes display device 300, display device 310, and/or display device 320 to display the information indicating the presence of the obstacle on the travel route of vehicle 10.

Display system 400 is disposed in, for example, vehicle 10. Specifically, display devices 300 to 320 controlled by display control device 100 are disposed in vehicle 10 (i.e., the same vehicle).

It should be noted that although not shown in the figure, in the present embodiment, both display control device 100 and detection device 200 are also disposed in vehicle 10.

Vehicle 10 is, for example, an automobile or a motorcycle, and is an automobile in the present embodiment. It should be noted that vehicle 10 may be, for example, a vessel or an aircraft.

As shown in FIG. 2, display system 400 includes detection device 200, display control device 100, display device 300, display device 310, display device 320, and audio device 330.

Detection device 200 is a detection device that detects various types of information. For example, detection device 200 obtains information about a predetermined event. For example, detection device 200 obtains information about vehicle 10. The information about vehicle 10 is, for example, position information about vehicle 10 or information including information about an obstacle located around vehicle 10 etc.

Detection device 200 includes imaging device 210 and navigation system 220.

Imaging device 210 is a camera that captures an area around vehicle 10. For example, imaging device 210 outputs data of an image (image data) generated by capturing an area around vehicle 10 to display control device 100.

It should be noted that imaging device 210 may determine whether an obstacle etc. is located around vehicle 10, based on a capturing result. In this case, imaging device 210 may output information indicating a determination result.

Navigation system 220 is equipment that obtains, for example, a travel route along which vehicle 10 is to travel. For example, navigation system 220 includes a wireless communication interface such as an antenna and a wireless communication circuit, receives, from an external device, map information indicating a map of roads on which vehicle 10 is to travel, and outputs the map information received to display control device 100. Moreover, for example, navigation system 220 receives, from an external device that is a computer such as a server device, state information indicating a state of a road on which vehicle 10 is traveling, and outputs the state information received to display control device 100. Furthermore, for example, navigation system 220 calculates a travel route and outputs information indicating the travel route calculated to display control device 100.

It should be noted that detection device 200 may include a global positioning system (GPS) receiver. Alternatively, detection device 200 may include an obstacle sensor that detects, for example, a position of and a distance to an object such as an obstacle around vehicle 10. The obstacle sensor is exemplified by an infrared sensor, an electromagnetic-wave sensor, and/or a millimeter-wave sensor, etc. Alternatively, detection device 200 may include a yaw rate sensor that measures a yaw rate of vehicle 10. Alternatively, detection device 200 may include a speed sensor that detects a speed of vehicle 10. Alternatively, detection device 200 may include a rudder sensor that measures a steering angle of a steering wheel etc. Alternatively, detection device 200 may be an external device such as a vehicle information and communication system (VICS) (registered trademark). Detection device 200 may include any combination of at least one of these sensors. Detection device 200 and display control device 100 may be communicably connected, communicably connected in a wired manner, or communicably connected in a wireless manner.

Moreover, detection device 200 may be disposed in vehicle 10 or disposed outside vehicle 10.

Furthermore, detection device 200 may detect a line-of-sight direction of the user other than a predetermined event. For example, detection device 200 further includes an imaging device that captures the face of the user. For example, the imaging device calculates a line-of-sight direction of the user based on a result of capturing the face of the user, and outputs line-of-sight information indicating the line-of-sight direction calculated to display control device 100.

Display control device 100 is a control device that controls detection device 200, display device 300, display device 310, display device 320, and audio device 330. Display control device 100 may be implemented as a computer including, for example: a communication interface for communicating with detection device 200, display devices 300 to 320, and audio device 330 included in display system 400; non-volatile memory in which a program is stored; volatile memory that is a transitory storage region for executing the program; an input-output port for transmitting and receiving a signal; and a processor that executes the program.

Display control device 100, detection device 200, display device 300, display device 310, display device 320, and audio device 330 may be communicably connected, communicably connected in a wired manner, or communicably connected in a wireless manner.

Display control device 100 includes obtainer 110, determination unit 120, determiner 130, controller 140, and storage 150.

Obtainer 110 is a processor that obtains information from detection device 200. For example, obtainer 110 obtains information about a predetermined event from detection device 200. Alternatively, for example, obtainer 110 obtains line-of-sight information indicating a line of sight of a user from detection device 200. Alternatively, for example, obtainer 110 obtains information indicating an action of the user (e.g., action information) from a user interface such as a touch panel that receives input from the user.

Determination unit 120 is a processor that determines a display device that is to display the information about the predetermined event.

It should be noted that hereinafter, the display device that is determined by determination unit 120 and is to display the information about the predetermined event is also referred to as a first display device. For example, determination unit 120 selects one display device from among a plurality of display devices (e.g., display devices 300 to 320) based on line-of-sight information indicating a line-of-sight direction of the user, and determines the one display device selected as the first display device.

Accordingly, since it is possible to cause a display device close to a position being viewed by the user to display first notification information, it is possible to quickly notify the user of new information about a predetermined event.

Moreover, determination unit 120 may determine, for display devices 300 to 320, priority levels for displaying information about a predetermined event. For example, determination unit 120 sets priority levels to be higher for display devices 300 to 320 in order of decreasing distance from a target position in a line-of-sight direction of the user, based on line-of-sight information.

Alternatively, determination unit 120 may set the priority levels based on the information amounts of information included in images displayed on a plurality of display devices 300 to 320. For example, determination unit 120 may set priority levels to be higher in order of increasing information amount of the information included in the images displayed on the plurality of display devices 300 to 320.

Alternatively, determination unit 120 may determine the priority levels based on specifications (e.g., resolutions or frame rates) of the plurality of display devices 300 to 320. For example, determination unit 120 may set the priority levels to be higher in order of decreasing resolution of the plurality of display devices 300 to 320.

It should be noted that the priority levels and the first display device may be determined in any manner in advance.

Furthermore, the information displayed on display devices 300 to 320 (i.e., the information included in the images displayed on display devices 300 to 320) is information notified to the user in characters and graphics etc. The information may include, for example, a picture and a video that is captured by imaging device 210.

Moreover, an information amount is the amount of information notified to the user that is represented by characters and graphics etc. An information amount is determined based on, for example, the number of characters and graphics etc. or the area of characters and graphics etc. (e.g., the number of pixels in one or more images for representing characters and graphics etc.).

For example, methods of displaying information such as (I) a detailed character string and a graphic, (II) a simplified character string and a graphic, (III) only a detailed character string, (IV) only a simplified character string, and (V) only a graphic are determined in advance. For example, a larger information amount is determined in order of above (I) to (V) in advance.

For example, when information about a predetermined event is information indicating that a pedestrian is approaching from the left ahead of the vehicle, at least one of display device 300, display device 310, or display device 320 displays the information about the predetermined event using one of the methods of displaying above-described (I) to (V).

FIG. 3A to FIG. 3E are each a diagram illustrating a specific example of notification information according to the embodiment.

Notification information is information about a predetermined event. For example, when information indicating that a pedestrian is approaching from the left ahead of the vehicle is displayed as information about a predetermined event using notification information, the information is displayed using a combination of at least any one of notification information 650 to 670. For example, above-described (I) is a combination of notification information 650 and notification information 670. Moreover, for example, above-described (II) is a combination of notification information 660 and notification information 670. Furthermore, for example, above-described (III) is only notification information 650. Moreover, for example, above-described (IV) is only notification information 660. Furthermore, for example, above-described (V) is only notification information 670. For example, when information about a predetermined event is notified to the user in detail, above-described (I) is selected, and notification information 650 and notification information 670 are displayed on one of display device 300, display device 310, or display device 320. In contrast, for example, when the information about the predetermined event is notified to the user in a simplified manner, above-described (V) is selected, and notification information 670 is displayed on one of display device 300, display device 310, or display device 320.

It should be noted that an information amount may be set in any manner, based on, for example, the complexity of a graphic.

Determiner 130 is a processor that determines the information amount of information (display information) included in an image displayed on each of display devices 300, 310, and 320. Specifically, determiner 130 determines whether the information amount of display information (first display information) included in a first display image displayed on the first display device determined by determination unit 120 is greater than or equal to a predetermined threshold value. For example, determiner 130 determines whether the information amount of the first display information included in the first display image displayed on the first display device is greater than or equal to a predetermined threshold value.

It should be noted that the first display image is an image displayed on the first display device.

Although display information includes, for example, notification information already displayed, the display information may include information not relevant to a predetermined event, such as a video obtained by imaging device 210, other than the notification information.

Furthermore, a predetermined threshold value may be determined in any manner in advance, and is not particularly limited. Alternatively, for example, determiner 130 may set a predetermined threshold value based on a traveling state of a vehicle in which a plurality of display devices controlled by display control device 100 are disposed. In the present embodiment, display devices 300 to 320 are disposed in vehicle 10, that is, the same vehicle. For example, determiner 130 sets a predetermined threshold value based on a traveling state of vehicle 10. Alternatively, a predetermined threshold value may be set based on specifications of display devices 300 to 320 such as resolutions or frame rates.

A traveling state is, for example, a state related to traveling of vehicle 10 such as a speed, an acceleration, a rotational speed, and a rotational angle of vehicle 10. For example, determiner 130 sets a predetermined threshold value to be lower with an increase in speed of vehicle 10.

It should be noted that information indicating a correlation between a traveling state and a threshold value may be determined in any manner in advance and stored in storage 150, and is not particularly limited.

Controller 140 is a processor that controls display device 300, display device 310, display device 320, and audio device 330. For example, controller 140 controls display device 300, display device 310, display device 320, and audio device 330, based on information obtained from detection device 200. Specifically, when determiner 130 determines that the information amount of first display information is greater than or equal to a predetermined threshold value, controller 140 (i) causes the first display device to display first display information and first notification information about a predetermined event. Additionally, when determiner 130 determines that the information amount of the first display information is greater than or equal to the predetermined threshold value, controller 140 (ii) causes a second display device to display second notification information about the predetermined event, the second display device being different from the first display device, the second notification information including the first notification information and having an information amount greater than the information amount of the first notification information.

The first notification information and the second notification information are each information about the same predetermined event. For example, when the first notification information is only notification information 670, the second notification information includes information composed of the same modes (e.g., characters and a graphic) as the first notification information, such as notification information 650 and notification information 670.

Accordingly, in a display device having a relatively large information amount of information displayed among a plurality of display devices, for example, when a predetermined event occurs, only simplified information is displayed in the case where new information about the predetermined event is notified to a user. For this reason, it is possible to notify the user of the new information while preventing the information amount displayed on the display device from increasing excessively. Moreover, by causing a display device having a relatively small information amount of information displayed to display the details of new information, it is possible for the user to understand the details of the new information at a desired timing. Therefore, the display control device according to one aspect of the present disclosure makes it possible to inhibit the reduction of visibility of information displayed on a display device, and inhibit the reduction of an information amount of information notified to the user.

It should be noted that controller 140 may determine the information amount of the first notification information based on the information amount of the first display information, and cause the first display device to display the first notification information having the information amount determined. For example, controller 140 determines the information amount of the first notification information to be smaller with an increase in information amount of the first display information.

Accordingly, since information corresponding to the information amount of information displayed on the first display device is newly displayed on the first display device, it is possible to cause the first display device to further display information having an appropriate information amount.

It should be noted that the information amount of the first notification information relative to the information amount of the first display information may be determined in any manner. The information amount of the first notification information relative to the information amount of the first display information may be determined to vary in proportion to an information amount or may be gradually determined.

Furthermore, when determiner 130 determines that the information amount of the first display information is less than the predetermined threshold value, controller 140 may cause the first display device to display the second notification information.

Accordingly, it is possible to prevent the plurality of display devices from displaying the same information unnecessarily.

Moreover, for example, when content indicated in notification information displayed on the first display device is addressed, controller 140 removes the notification information from the first display image. For example, in the case where notification information is information indicating overspeed, controller 140 removes the notification information from display information when the overspeed is addressed. For example, when determiner 130 determines that the information amount of the first display information is less than the predetermined threshold value after determiner 130 determines that the information amount of the first display information is greater than or equal to the predetermined threshold value and the first display device is caused to display the first notification information, controller 140 may cause the first display device to display the second notification information instead of the first notification information. Additionally, in this case, controller 140 may remove the second notification information displayed on the second display device.

In the following description, the first display device is referred to as display device 300, and the second display device is referred to as display device 310.

Figure 4A:
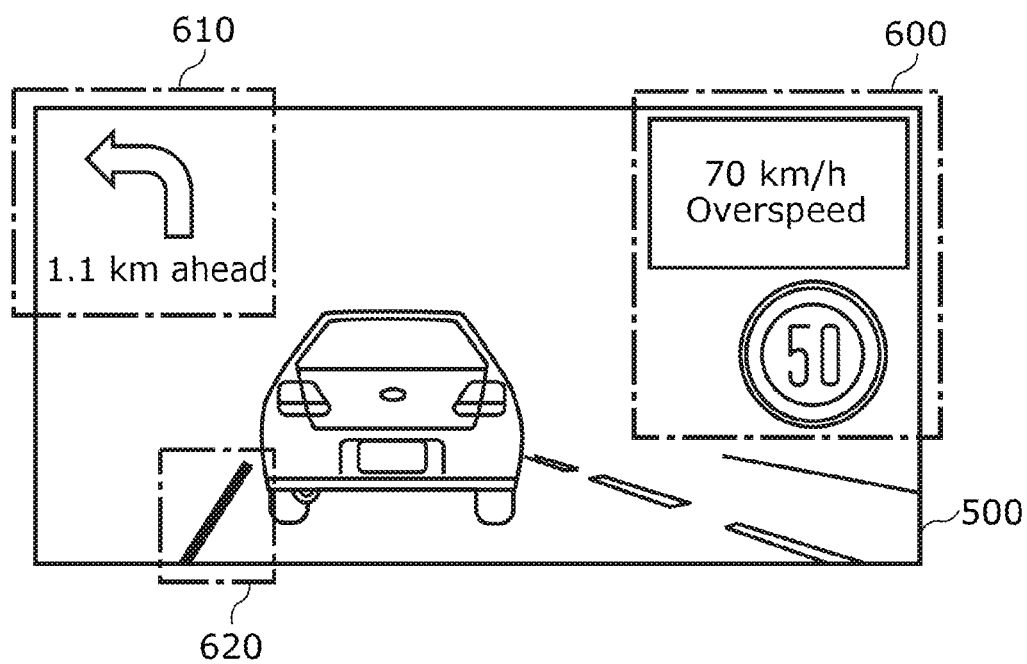
FIG. 4A is a diagram illustrating a specific example of a display image according to the embodiment.
Figure 4B:
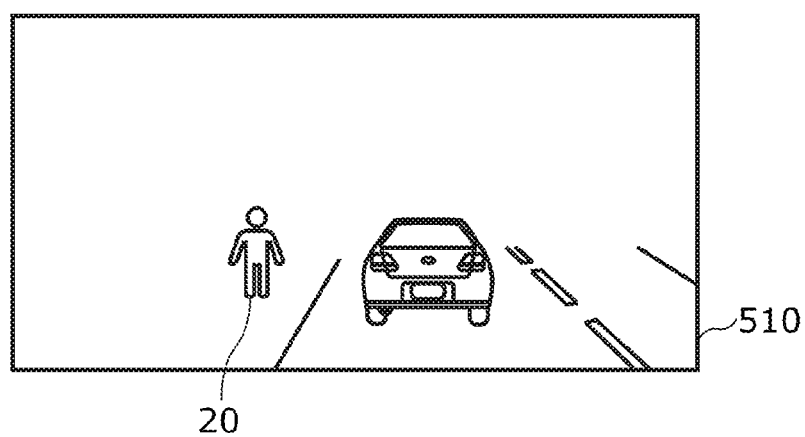
FIG. 4B is a diagram illustrating a specific example of a display image according to the embodiment.
Figure 5A:
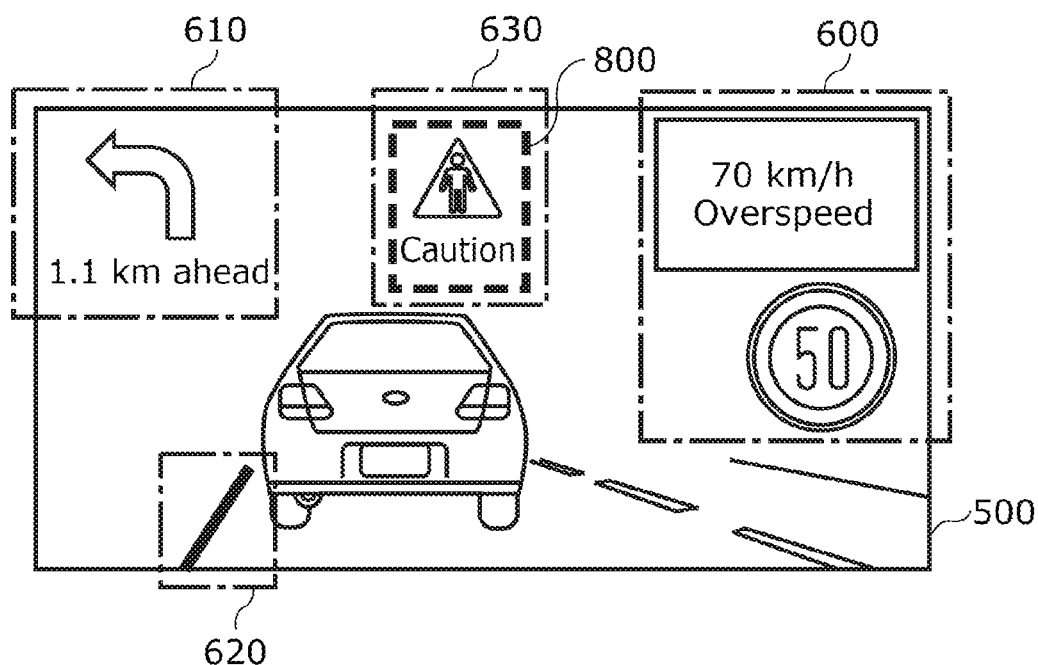
FIG. 5A is a diagram illustrating a specific example of a display image according to the embodiment.
Figure 5B:
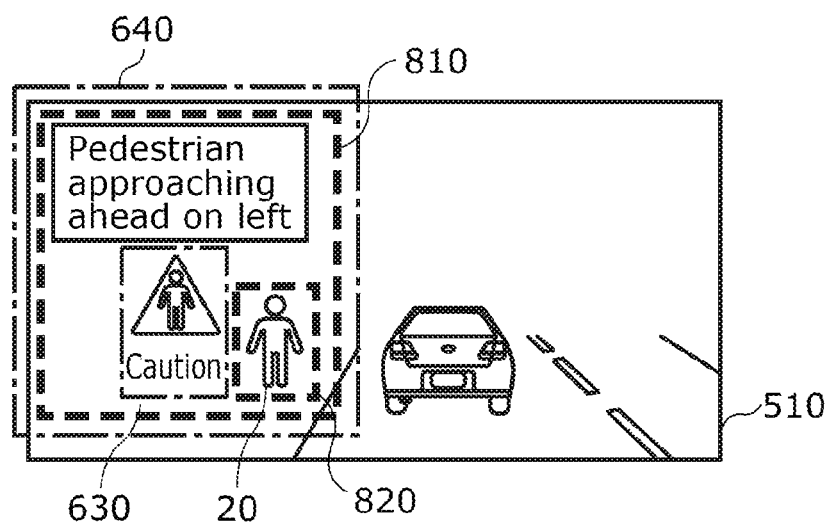
FIG. 5B is a diagram illustrating a specific example of a display image according to the embodiment.

FIG. 4A and FIG. 5A are each a diagram illustrating a specific example of display image 500 according to the present embodiment, and FIG. 4B and FIG. 5B are each a diagram illustrating a specific example of display image 510 according to the present embodiment.

Specifically, FIG. 4A and FIG. 4B are diagrams illustrating display images 500 and 510, respectively, before obtainer 110 obtains information about an additional predetermined event; and FIG. 5A and FIG. 5B are diagrams illustrating display images 500 and 510, respectively, after obtainer 110 obtains the information about the additional predetermined event.

As shown in FIG. 4A, for example, display image 500 before obtainer 110 obtains the information about the additional predetermined event is assumed to include notification information 600, 610, and 620. To put it another way, in this case, for example, display information included in display image 500 are notification information 600, 610, and 620.

For example, notification information 600 is warning information for warning the user when the speed of vehicle 10 exceeds a prescribed speed.

Moreover, for example, notification information 610 is navigation information for guiding the user along a travel route.

Furthermore, for example, notification information 620 is caution information for cautioning the user about a potential lane departure of vehicle 10.

It should be noted that as with notification information 620, notification information that controller 140 causes a display device to display may be caused to have a thicker line, surrounded, or colored, etc. in a display image.

Moreover, as shown in FIG. 4B, for example, display image 510 before obtainer 110 obtains the information about the additional predetermined event is assumed to include no notification information and show only a video obtained by imaging device 210. In the present embodiment, display image 510 includes object 20 that is a pedestrian.

In a state shown in FIG. 4A and FIG. 4B, for example, object 20 is assumed to have approached up to a predetermined distance to a travel route of vehicle 10. In other words, for example, detection device 200 is assumed to detect the predetermined event "object 20 has approached up to the predetermined distance to the travel route of vehicle 10." In this case, for example, detection device 200 outputs information about the predetermined event (e.g., information indicating that a predetermined event has occurred) to display control device 100. Controller 140 controls display devices 300, 310, and 320 based on the information about the predetermined event.

In the present embodiment, for example, controller 140 causes display device 300 to display, as notification information (first notification information), simplified information indicating that object 20 has approached up to the predetermined distance to the travel route of vehicle 10. For example, as shown in FIG. 5A, display image 500 includes notification information 630 as the first notification information indicating that object 20 has approached up to the predetermined distance to the travel route of vehicle 10.

Moreover, for example, controller 140 causes display device 300 to display, as notification information (second notification information), detailed information indicating that object 20 has approached up to the predetermined distance to the travel route of vehicle 10. For example, as shown in FIG. 5B, display image 510 includes notification information 640 as the second notification information indicating that object 20 has approached up to the predetermined distance to the travel route of vehicle 10.

It should be noted that the second notification information includes the first notification information. In the present embodiment, notification information 640 includes notification information 630.

Furthermore, a predetermined distance may be determined in any manner in advance.

Moreover, controller 140 causes display device 300 and display device 310 to display notification information 630 and notification information 640 surrounded with frames of the same color and in the same shape (relevance information 800 and relevance information 810), respectively. Accordingly, controller 140 notifies the user that the first notification information and the second notification information are relevant to each other. Each of the frames is an example of relevance information (first relevance information). In the present embodiment, notification information 630 and notification information 640 are surrounded with dotted frames. As stated above, for example, controller 140 notifies the user of the first relevance information indicating that the first notification information and the second notification information are relevant to each other. In the present embodiment, controller 140 notifies the user of the first relevance information by causing display device 300 and display device 310 to display relevance information 810 and relevance information 820, respectively.

When the approach of a pedestrian is notified to a driver, messages are simultaneously displayed on the same display device, which makes a display image displayed on the display device complicated. This reduces the visibility of the information. Moreover, in the case where a display device is a HUD, when a display image displayed on the display device is made complicated, it becomes difficult to see ahead of vehicle 10. In view of this, for example, a message (information) displayed on display device 300 is replaced with a simple message, display device 310 is caused to display details of the message, and relevance of the message displayed on display device 300 to a message displayed on display device 310 (i.e., that these messages have relevance to each other) is further notified to the user by using, for example, graphics surrounded with frames of the same color etc. and/or a voice notification.

Accordingly, it is possible for the user to easily understand on which display device the details of the simplified information displayed on display device 300 are displayed.

Furthermore, notification information 640 is the information indicating that object 20 has approached up to the predetermined distance to the travel route of vehicle 10. By causing display device 310 to display notification information 640 and object 20 surrounded with frames of the same color and in the same shape (relevance information 810 and relevance information 820), controller 140 notifies the user that the second notification information and object 20 are relevant to each other. Each of the frames is an example of relevance information (second relevance information). In the present embodiment, notification information 640 and object 20 are surrounded with dotted frames. As stated above, for example, determiner 130 determines whether second display information (specifically, information included in display image 510 shown in FIG. 4B) displayed on the second display device (e.g., display device 310) and the second notification information are relevant to each other. In this case, for example, when determiner 130 determines that the second display information and the second notification information are relevant to each other, controller 140 notifies the user of the second relevance information indicating that the second display information and the second notification information are relevant to each other. In the present embodiment, controller 140 notifies the user of the second relevance information by causing display device 310 to display relevance information 810 and relevance information 820.

For example, display device 310 constantly displays an image of an area surrounding vehicle 10 (in the present embodiment, display image 510 shown in FIG. 4B) captured by imaging device 210. In such a case, an event relevant to the image such as object 20 approaching vehicle 10 may occur. At a time like this, by causing display device 310 to display the second relevance information indicating that notification information (e.g., notification information 640) newly displayed on display device 310 and information already displayed on display device 310 are relevant to each other, it is possible to help the user more easily understand details of the notification information newly displayed on display device 310.

It should be noted that a mode in which relevance information is notified to the user may be any mode such as a character, a graphic, a voice, and/or blinking of what is displayed. For example, although the relevance information is indicated by the dotted line above, the relevance information may be indicated by a colored line such as a red line or a blue line, use of a uniform color such as red or blue for characters, or voice. For example, controller 140 causes at least one of display device 300, display device 310, display device 320, or audio device 330 to notify the relevance information.

For example, controller 140 may cause audio device 330 to output information about a predetermined event, such as "Pedestrian is approaching. Please look ahead on the left.", at a timing when display device 300 is caused to display notification information 630. Alternatively, for example, controller 140 may cause audio device 330 to notify the user that display device 310 is caused to display information relevant to notification information 630, such as "Pedestrian is approaching. Please check the left side of the display for details.", at the above timing, that is, to notify the user of the first relevance information by voice. Alternatively, for example, display system 400 may include audio devices (e.g., loudspeakers) at a position adjacent to display device 300, a position adjacent to display device 310, and a position adjacent to display device 320, respectively. For example, controller 140 may cause an audio device adjacent to a display device caused to display the second notification information to notify the user of relevance information by voice. Additionally, for example, as with notification information 690 shown in FIG. 3E, a position of the second notification information may be indicated in the first notification information being displayed in the same manner as an arrow (the left side in the example shown in FIG. 3E) indicating the position at which the second notification information is displayed. In the example shown in FIG. 3E, a graphic that appears as a left arrow is the first relevance information.

Alternatively, for example, that notification information 630 and notification information 640 are relevant to each other may be notified to the user by causing notification information 630 and notification information 640 to blink at the same timing.

It should be noted that relevance information notified to the user may be achieved by a combination of at least two of the above specific examples.

Moreover, notification information 600 to 690 and the relevance information shown in FIG. 4A to FIG. 5B are mere examples, and the present disclosure is not limited to these. Any characters and graphics etc. may be used as notification information and relevance information.

Furthermore, a predetermined event may be determined in any manner in advance, and is not particularly limited. For example, when navigation system 220 etc. detects "Instruction to turn left at intersection 1.1 Km ahead" as a predetermined event, controller 140 may cause display device 300 to display notification information 680 including the first relevance information such as "Navigation screen", and cause display device 320 to display notification information 610.

Moreover, controller 140 may determine a notification mode (output mode) in which information about a predetermined event is notified to the user, based on a priority level of the information.

FIG. 6 is a diagram illustrating a specific example of output modes for information according to priority levels.

For example, when a priority level of information about a predetermined event obtained by obtainer 110 is high (e.g., priority level "High" in the table shown in FIG. 6), controller 140 causes audio device 330 to output the information by voice, and causes display device 300 to display the first notification information of the information in a blinking manner. In addition, for example, controller 140 causes display device 300 to display, as the first relevance information, information indicating a location of display device 310 (e.g., a position or name of display device 310), and causes display devices 300 and 310 to display, as the second relevance information, the first notification information and the second notification information in the same color, respectively.

Furthermore, for example, when a priority level of information about a predetermined event obtained by obtainer 110 is medium (e.g., priority level "Medium" in the table shown in FIG. 6), controller 140 causes display device 300 to display the first notification information of the information in a blinking manner. In addition, for example, controller 140 causes display device 300 to display, as the first relevance information, information indicating a location of display device 310 (e.g., a position or name of display device 310), and causes display devices 300 and 310 to display, as the second relevance information, the first notification information and the second notification information in the same color, respectively.

Moreover, for example, when a priority level of information about a predetermined event obtained by obtainer 110 is low (e.g., priority level "Low" in the table shown in FIG. 6), controller 140 causes display device 300 to display, as the first relevance information, information indicating a location of display device 310 (e.g., a position or name of display device 310), and causes display devices 300 and 310 to display, as the second relevance information, the first notification information and the second notification information in the same color, respectively.

It should be noted that information indicating a relation between a priority level (priority information) and information about a predetermined event may be determined in any manner in advance, and is not particularly limited.

Furthermore, controller 140 may change a display mode of display device 300 to display the first notification information after causing display device 300 to display the second notification information.

Moreover, although a condition for determining an output mode is a priority level in the above description, the condition for determining the output mode is not particularly limited. For example, the condition for determining the output mode may be determined based on the degree of complexity of display information displayed on display devices 300 to 320 (e.g., the number of displayed information items). Alternatively, for example, the condition for determining the output mode may be determined by the user etc. in any manner. Alternatively, for example, the condition for determining the output mode may be determined based on a traveling state of vehicle 10.

Furthermore, for example, an output mode may be changed based on a lapse of time or whether the user has perceived notification information.

Figure 7A:
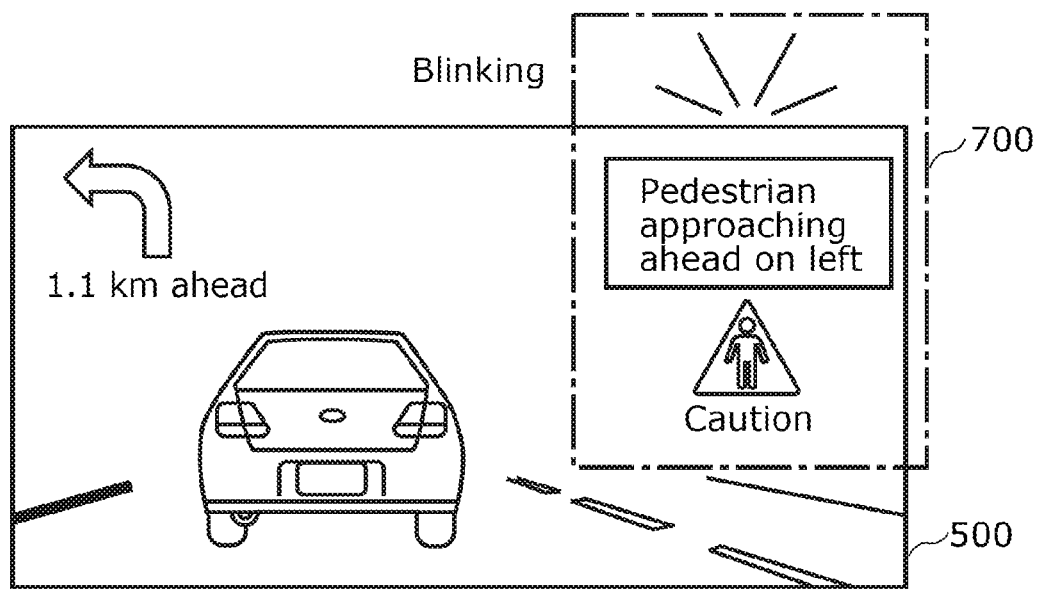
FIG. 7A is a diagram illustrating a specific example of a display image according to the embodiment.
Figure 7B:
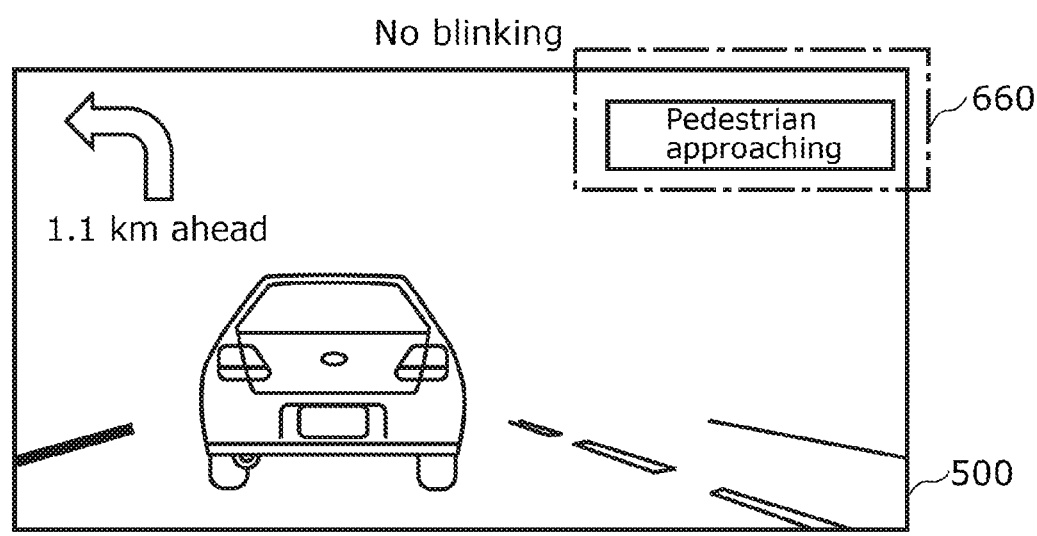
FIG. 7B is a diagram illustrating a specific example of a display image according to the embodiment.

FIG. 7A and FIG. 7B are each a diagram illustrating a specific example of display image 500 according to the present embodiment. Specifically, FIG. 7A is a diagram illustrating an example of a display image including the second notification information, and FIG. 7B is a diagram illustrating display image 500 obtained by causing display image 500 shown in FIG. 7A to include the first notification information.

For example, obtainer 110 is assumed to have obtained information about a predetermined event that object 20 approached up to a predetermined distance to a travel route of vehicle 10. In this case, for example, controller 140 causes display device 300 to display the second notification information by causing display device 300 to display notification information such as notification information 700 shown in FIG. 7A in a blinking manner.

Next, controller 140 causes display device 300 to display the first notification information by causing display device 300 to display notification information 660 in a non-blinking manner as shown in FIG. 7B.

It should be noted that, though not shown in the figures, when controller 140 causes display device 300 to display the first notification information, controller 140 may cause display device 310 to display the second notification information.

As stated above, for example, when determiner 130 determines that the information amount of the first display information is greater than or equal to a predetermined threshold value, controller 140 causes display device 300 to display the second notification information; and when a predetermined condition is satisfied, controller 140 causes display device 300 to display the first notification information instead of the second notification information, and causes display device 310 to display the second notification information.

Accordingly, by first notifying the user of details of information that needs to be especially preferentially notified to the user and reducing an information amount in accordance with the predetermined condition, it is possible to quickly notify the user of a lot of information and inhibit the reduction of visibility of information displayed on display device 300.

It should be noted that a predetermined condition may be determined in any manner in advance, and is not particularly limited. For example, when the predetermined condition is satisfied refers to at least one of when controller 140 obtains action information indicating that the user has performed an action based on the second notification information or when a predetermined time has elapsed since controller 140 caused to display device 300 to display the second notification information.

Action information is, for example, line-of-sight information of the user. For example, when detection device 200 detects that the user has turned the user's eyes to the second notification information displayed on display device 300, detection device 200 outputs information indicating the detection as action information to display control device 100. Alternatively, for example, display system 400 may include an operating device such a touch panel that receives an operation of the user. In this case, when controller 140 obtains, as action information, information indicating that the second notification has been checked, from the user via the operating device, controller 140 may determine that a predetermined condition has been satisfied. Alternatively, for example, in the case where the second notification information is information indicating that a pedestrian is approaching from the left front, when the user looks ahead on the left, that is, when detection device 200 detects that the user has turned the user's eyes to the left front, action information indicating that the user has performed an action based on the second notification information may be obtained.

As stated above, for example, an action based on the second notification information is an action performed by the user to check the second notification information or an action corresponding to content indicated in the second notification information.

Accordingly, it is possible to reduce the information amount displayed on display device 300 at an appropriate timing.

It should be noted that a predetermined time may be determined in any manner in advance, and is not particularly limited.

Moreover, controller 140 may include a timer such as a real-time clock (RTC).

Storage 150 is a storage device that stores a control program executed by the processor included in display control device 100, threshold information indicating a predetermined threshold value, priority information indicating priority levels of predetermined events, and information amount information indicating correlations between display modes of notification information and information amounts, etc. Storage 150 is implemented by, for example, a flash memory or a hard disk drive (HDD).

It should be noted that display control device 100 may be disposed in vehicle 10 or disposed outside vehicle 10.

Audio device 330 is an audio device caused by controller 140 to output a sound. Audio device 330 is implemented by, for example, an amplifier or a loudspeaker.

It should be noted that a sound outputted by audio device 330 may be a sound indicating a predetermined character string (e.g., a voice such as "Pedestrian is approaching." or "Please look ahead on the left."), a mechanical sound, or a warning sound, and is not particularly limited.

Procedure

Figure 8:
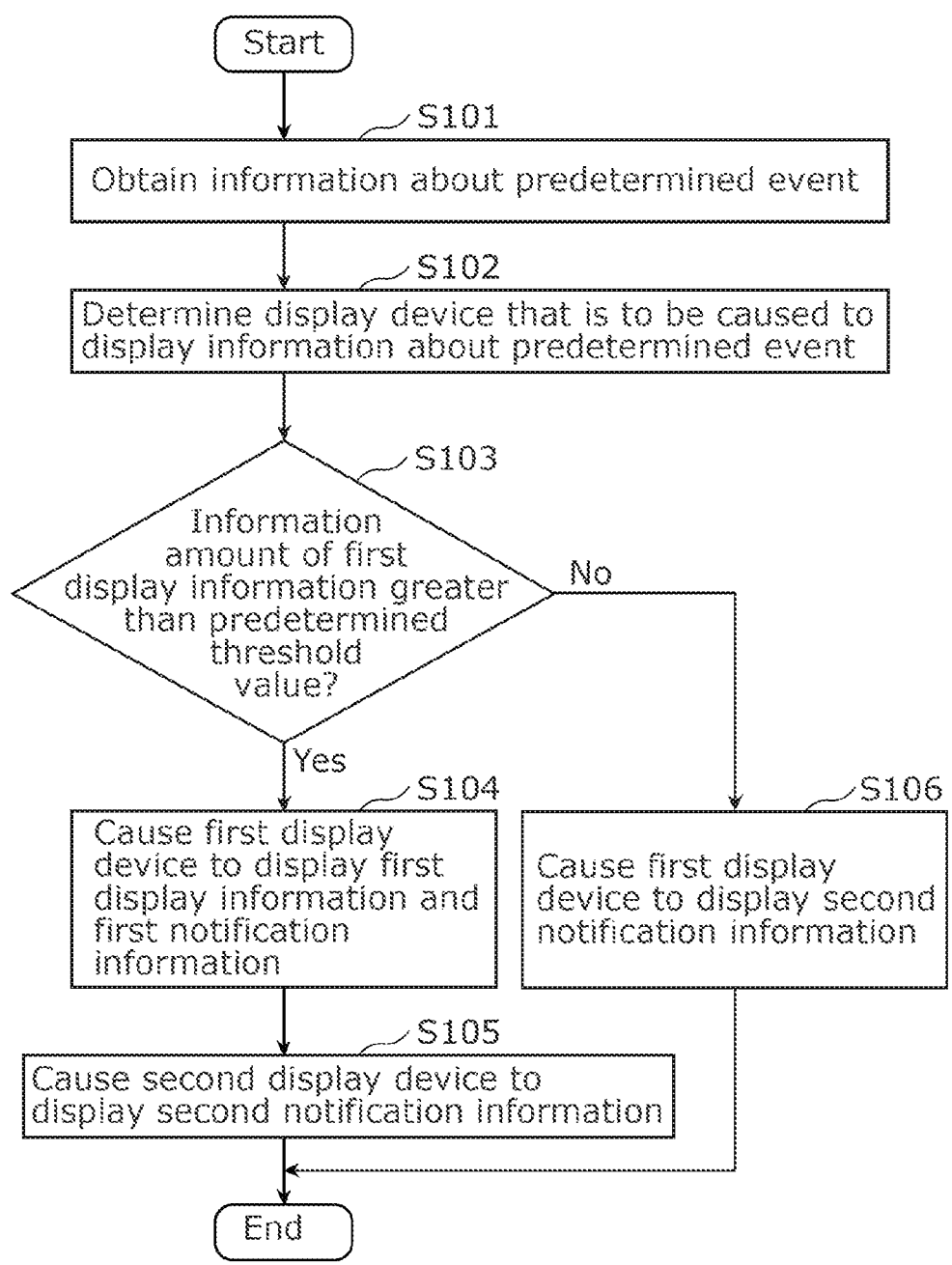
FIG. 8 is a flow chart illustrating a procedure of the display control device according to the embodiment.

FIG. 8 is a flow chart illustrating a procedure of display control device 100 according to the present embodiment.

First, obtainer 110 obtains information about a predetermined event from detection device 200 (S101).

Next, determination unit 120 determines a display device (first display device) that is to be caused to display the information about the predetermined event obtained by obtainer 110 (S102). For example, determination unit 120 determines the first display device based on line-of-sight information. In this case, determination unit 120 is assumed to have determined display device 300 as the first display device.

Then, determiner 130 determines whether the information amount of first display information included in a first display image (display image 500) displayed on the first display device (display device 300) is greater than or equal to a predetermined threshold value (S103).

When determiner 130 determines that the information amount of the first display information included in display image 500 displayed on display device 300 is greater than or equal to the predetermined threshold value (Yes in S103), controller 140 causes display device 300 to display the first display information and first notification information, that is, simplified information obtained by simplifying the information about the predetermined event (S104). For example, controller 140 causes the first notification information to be superimposed on display image 500 displayed on display device 300.

After that, controller 140 causes a second display device to display second notification information, that is, detailed information indicating details of the information about the predetermined event (S105). In this case, determination unit 120 is assumed to have set priority levels of display devices 300 to 320 to be higher in order of display device 300, display device 310, and display device 320 in step S102. For example, when display device 310 that is the second display device displays display image 510 that is a second display image, controller 140 causes the second notification information to be superimposed on display image 510 displayed on display device 310.

On the other hand, when determiner 130 determines that the information amount of the first display information included in display image 500 displayed on display device 300 is not greater than or equal to the predetermined threshold value (No in S103), controller 140 causes display device 300 to display second notification information (S106). For example, controller 140 causes the second notification information to be superimposed on display image 500 displayed on display device 300.

Advantageous Effects etc.

As described above, display control device 100 according to the present embodiment includes: determiner 130 that determines whether an information amount of first display information displayed on a first display device (e.g., display device 300) is greater than or equal to a predetermined threshold value; and controller 140 that (i) causes the first display device to display the first display information and first notification information about a predetermined event, and (ii) causes a second display device (e.g., display device 310) to display second notification information about the predetermined event, when determiner 130 determines that the information amount of the first display information is greater than or equal to the predetermined threshold value, the second display device being different from the first display device, the second notification information including the first notification information and having an information amount larger than an information amount of the first notification information. For example, when determiner 130 determines that the information amount of the first display information is less than the predetermined threshold value, controller 140 causes the first display device to display the second notification information.

In this manner, when display control device 100 determines that an information amount displayed on the first display device becomes excessive and complicated, display control device 100 causes the first display device to display a simple message (simple information). Additionally, by displaying a combination of simple information and detailed information in a coordinated manner using a plurality of display devices, display control device 100 notifies the user of the combination without reducing an information amount while ensuring visibility. Specifically, in a display device having a large information amount displayed, for example, in the case where a predetermined event occurs, only simplified information is displayed when new information about the predetermined event is notified to the user. For this reason, it is possible to prevent the information amount displayed on the display device from becoming excessive, and to notify the user of the new information. Moreover, by causing a display device having a small information amount of information displayed to display the details of new information, it is possible for the user to understand the details of the new information at a desired timing. Accordingly, the display control device according to one aspect of the present disclosure makes it possible to inhibit the reduction of visibility of information displayed on a display device, and inhibit the reduction of an information amount of information notified to the user.

Furthermore, for example, controller 140 causes a display device to display relevance information indicating that information displayed on the display device and information displayed on an other display device are relevant to each other.

For example, display control device 100 causes a display device different from a display device caused to display simple information to display detailed information at the same timing as the timing at which the simple information is displayed, and further clearly shows relevance of the simple information to the detailed information using simple frames of the same color etc. Accordingly, it is possible for the user to easily understand on which display device among the plurality of display devices details of simplified information are displayed. When the same application (device) that has generated information displayed on a display device is used, relevance may be determined to be present; and when types of information displayed on a display device are the same, relevance may be determined to be present. For example, detection device 200 may add type information (e.g., speed information and/or navigation information) indicating a type of a predetermined event to information relevant to the predetermined event outputted to display control device 100. Display control device 100 may determine whether information items have relevance to one another, based on the type information.

Moreover, for example, the first display device and the second display device are disposed in vehicle 10 (i.e., the same vehicle). In this case, for example, determiner 130 sets a predetermined threshold value based on a traveling state of vehicle 10.

For example, since it is assumed that the driver has to pay more attention to driving when vehicle 10 is at high speed than when vehicle 10 is at low speed, it is considered difficult to obtain information from a display device. In view of this, by appropriately setting an information amount to be displayed on the first display device based on a traveling state of vehicle 10 such as a speed of vehicle 10 and a right turn or a left turn made by vehicle 10, it is possible to help the user more easily understand information displayed on the first display device.

Furthermore, for example, controller 140 may cause the first display device to display the first notification information instead of the second notification information after causing the first display device to display the second notification information.

Accordingly, by first notifying the user of details of information that needs to be especially preferentially notified to the user and reducing an information amount in accordance with an elapsed time etc., it is possible to quickly notify the user of a lot of information and inhibit the reduction of visibility of information displayed on the first display device.

It should be noted that these general or specific aspects may be implemented using a system, a method, an integrated circuit, a computer program, or a non-transitory computer-readable recording medium such as a CD-ROM, or any combination of systems, methods, integrated circuits, computer programs, and non-transitory recording media.

For example, a display control method according to one aspect of the present disclosure includes: determining whether an information amount of first display information displayed on a first display device is greater than or equal to a predetermined threshold value (S103); and (i) causing the first display device to display the first display information and first notification information about a predetermined event (S104), and (ii) causing a second display device to display second notification information about the predetermined event (S105), when the information amount of the first display information is determined to be greater than or equal to the predetermined threshold value (Yes in S103), the second display device being different from the first display device, the second notification information including the first notification information and having an information amount larger than an information amount of the first notification information.

For example, a program according to one aspect of the present disclosure is a computer program for causing a computer to execute the above-described display control method.

The above method and program produce the same advantageous effects as display control device 100.

Other Embodiments

Although the display control device etc. according to one or more aspects has thus far been described based on the aforementioned embodiment, the present disclosure is not limited to the aforementioned embodiment. Forms obtained by various modifications to the aforementioned embodiment that can be conceived by a person skilled in the art may be included in the scope of the present disclosure, as long as they do not depart from the essence of the present disclosure.

For example, although detection device 200 determines whether a predetermined event has occurred in the aforementioned embodiment, display control device 100 may determine whether a predetermined event has occurred. Moreover, detection device 200 may determine in what mode information about a predetermined event is to be displayed, or display control device 100 may determine the same. For example, when a predetermined event occurs, detection device 200 may determine which of display device 300, display device 310, and display device 320 is caused to display notification information, or display control device 100 may determine the same. Furthermore, detection device 200 may store information indicating modes when display device 300, display device 310, and display device 320 are caused to display, for example, characters and graphics such as notification information 600 to 700, or display control device 100 may store the same.

Moreover, for example, in the aforementioned embodiment, each of constituent elements of the processors included in display system 400 may be implemented by dedicated hardware or may be achieved by executing a software program suitable for the constituent element. Each constituent element may be achieved by a program executing unit, such as a central processing unit (CPU) or a processor, reading out and executing a software program recorded on a non-transitory recording medium such as a hard disk or semiconductor memory.

It should be noted that the following cases are also included in the present disclosure.

(1) At least one of the above-described devices is specifically a computer system including a microprocessor, read-only memory (ROM), random-access memory (RAM), a hard disk unit, a display unit, a keyboard, and a mouse, etc. A computer program is stored in the RAM or the hard disk unit. The microprocessor operates according to the computer program, thereby allowing the at least one of the above-described devices to perform the function. Here, the computer program is configured by combining a plurality of instruction codes each indicating a command to a computer, in order to achieve predetermined functions.

(2) Some or all of the constituent elements included in the at least one of the above-described devices may be configured from a single system large-scale integration (LSI). The system LSI is a super-multifunctional LSI manufactured by integrating a plurality of components on a single chip, and is specifically a computer system including a microprocessor, ROM, and RAM, etc. A computer program is stored in the RAM. The microprocessor operates according to the computer program, thereby allowing the system LSI to perform the function.

(3) Some or all of the constituent elements included in the at least one of the above-described devices may be configured from an IC card or a stand-alone module detachable to the device. The IC card or the module is a computer system configured from a microprocessor, ROM, and RAM, etc. The IC card or the module may include the above super-multifunctional LSI. The microprocessor operates according to a computer program, thereby allowing the IC card or the module to perform the function. The IC card or the module may have tamper-resistance.

(4) The present disclosure may be a method described above. In addition, the present disclosure may be a computer program that achieves these methods using a computer, or may be a digital signal that includes the computer program.

Moreover, the present disclosure may be a non-transitory computer-readable recording medium having recorded thereon a computer program or a digital signal, such as a flexible disk, a hard disk, Compact Disc (CD)-ROM, DVD, DVD-ROM, DVD-RAM, Blu-ray (registered trademark) Disc (BD), or semiconductor memory. In addition, the present disclosure may be digital signals recorded on these recording media.

Furthermore, the present disclosure may transmit a computer program or a digital signal via, for example, data broadcasting or a network represented by electric telecommunication lines, wireless or wired communication lines, and the Internet.

Moreover, a program or a digital signal may be executed by another independent computer system by being recorded on a recording medium and transferred, or by being transferred via a network etc.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2021-177342 filed on Oct. 29, 2021 and PCT International Application No. PCT/JP2022/038866 filed on Oct. 19, 2022.

Industrial Applicability

The present disclosure is applicable to, for example, a device that controls a plurality of display devices included in a vehicle.

The invention claimed is:

1. A display control device comprising:
a determiner circuit that determines whether an information amount of first display information displayed on a first display device is greater than or equal to a predetermined threshold value; and
a controller circuit that
(i) causes the first display device to display the first display information and first notification information about a predetermined event, and
(ii) causes a second display device to display second notification information about the predetermined event, the second display device being different from the first display device, wherein when the determiner circuit determines that the information amount of the first display information is greater than or equal to the predetermined threshold value, the second notification information includes the first notification information and has an information amount larger than an information amount of the first notification information.

2. The display control device according to claim 1, wherein the controller circuit notifies a user of first relevance information indicating that the first notification information and the second notification information are relevant to each other.

3. The display control device according to claim 1, wherein the determiner circuit determines whether second display information displayed on the second display device and the second notification information are relevant to each other, and the controller circuit notifies a user of second relevance information indicating that the second display information and the second notification information are relevant to each other, when the determiner circuit determines that the second display information and the second notification information are relevant to each other.

4. The display control device according to claim 1, comprising:

a determination circuit that selects one display device from among a plurality of display devices based on line-of-sight information indicating a line of sight of a user, and determines the one display device to be the first display device.

5. The display control device according to claim 1, wherein the controller circuit determines the information amount of the first notification information based on the information amount of the first display information, and causes the first display device to display the first notification information having the information amount determined.

6. The display control device according to claim 1, wherein the first display device and the second display device are disposed in a vehicle, and the determiner circuit sets the predetermined threshold value based on a traveling state of the vehicle.

7. The display control device according to claim 1, wherein when the determiner circuit determines that the information amount of the first display information is greater than or equal to the predetermined threshold value, the controller circuit causes the first display device to display the second notification information; and when a predetermined condition is satisfied, the controller circuit causes the first display device to display the first notification information instead of the second notification information, and causes the second display device to display the second notification information.

8. The display control device according to claim 7, wherein when the predetermined condition is satisfied refers to at least one of when the controller circuit obtains action information or when a predetermined time has elapsed since the controller circuit caused the first display device to display the second notification information, the action information indicating that a user has performed an action based on the second notification information.

9. The display control device according to claim 1, wherein when the determiner circuit determines that the information amount of the first display information is less than the predetermined threshold value, the controller circuit causes the first display device to display the second notification information.

10. A display control method comprising:

determining whether an information amount of first display information displayed on a first display device is greater than or equal to a predetermined threshold value; and (i) causing the first display device to display the first display information and first notification information about a predetermined event, and (ii) causing a second display device to display second notification information about the predetermined event, the second display device being different from the first display device, wherein when the information amount of the first display information is determined to be greater than or equal to the predetermined threshold value, the second notification information includes the first notification information and has an information amount larger than an information amount of the first notification information.

11. A non-transitory computer-readable recording medium having recorded thereon a computer program for causing a computer to execute the display control method according to claim 10.

\* \* \* \* \*